(12) United States Patent
Komi et al.

(10) Patent No.: US 10,355,556 B2
(45) Date of Patent: Jul. 16, 2019

(54) MOTOR DRIVE DEVICE

(71) Applicant: AISIN SEIKI KABUSHIKI KAISHA, Kariya-shi, Aichi-ken (JP)

(72) Inventors: Yoshiyuki Komi, Hamamatsu (JP); Takahiro Misu, Nagoya (JP); Tomoyuki Toyama, Chita (JP); Shota Hirose, Toyoake (JP); Takeshi Tojo, Chiryu (JP); Shinya Harada, Tokyo-to (JP)

(73) Assignee: AISIN SEIKI KABUSHIKI KAISHA, Kariya-shi, Aichi-Ken (JP)

( * ) Notice: Subject to any disclaimer, the term of this patent is extended or adjusted under 35 U.S.C. 154(b) by 300 days.

(21) Appl. No.: 15/466,240

(22) Filed: Mar. 22, 2017

(65) Prior Publication Data
US 2017/0279336 A1 Sep. 28, 2017

(30) Foreign Application Priority Data

Mar. 24, 2016 (JP) ................. 2016-060934

(51) Int. Cl.
| | |
|---|---|
| H02K 7/10 | (2006.01) |
| H02K 7/108 | (2006.01) |
| H02K 7/00 | (2006.01) |
| F16H 3/00 | (2006.01) |
| H02K 7/116 | (2006.01) |
| F16D 41/00 | (2006.01) |
| F16H 1/22 | (2006.01) |
| F16H 37/08 | (2006.01) |
| F16H 48/08 | (2006.01) |

(52) U.S. Cl.
CPC ............ *H02K 7/108* (2013.01); *F16H 3/003* (2013.01); *H02K 7/003* (2013.01); *H02K 7/006* (2013.01); *H02K 7/116* (2013.01); *F16D 41/00* (2013.01); *F16H 1/22* (2013.01); *F16H 37/0806* (2013.01); *F16H 48/08* (2013.01); *F16H 2200/0021* (2013.01); *F16H 2200/0034* (2013.01)

(58) Field of Classification Search
CPC ........ H02K 7/003; H02K 7/006; H02K 7/116; H02K 7/108; F16H 3/003; F16H 1/22
USPC .............................................. 310/78, 92, 83
See application file for complete search history.

(56) References Cited

U.S. PATENT DOCUMENTS

| | | | |
|---|---|---|---|
| 2004/0084979 A1* | 5/2004 | Hughes | F16D 48/06 310/78 |
| 2015/0038277 A1* | 2/2015 | Tamura | B60K 17/356 475/150 |

FOREIGN PATENT DOCUMENTS

JP   2012-172796 A   9/2012

* cited by examiner

*Primary Examiner* — Hanh N Nguyen
(74) *Attorney, Agent, or Firm* — Buchanan Ingersoll & Rooney PC

(57) ABSTRACT

A motor drive device includes a stator, a rotor, a first output shaft being provided in the rotor shaft and integrally rotating with a first drive gear, a second output shaft being provided in the first output shaft and integrally rotating with a second drive gear, a first one-way clutch being provided between an inner periphery of the rotor shaft and an outer periphery of the first output shaft, the first one-way clutch transmitting only a driving force that operates in a first direction, a second one-way clutch being provided between the inner periphery of the rotor shaft and an outer periphery of the second output shaft, the second one-way clutch transmitting only a driving force that operates in a second direction that is opposite to the first direction, and a decelerator.

20 Claims, 2 Drawing Sheets

F I G. 1
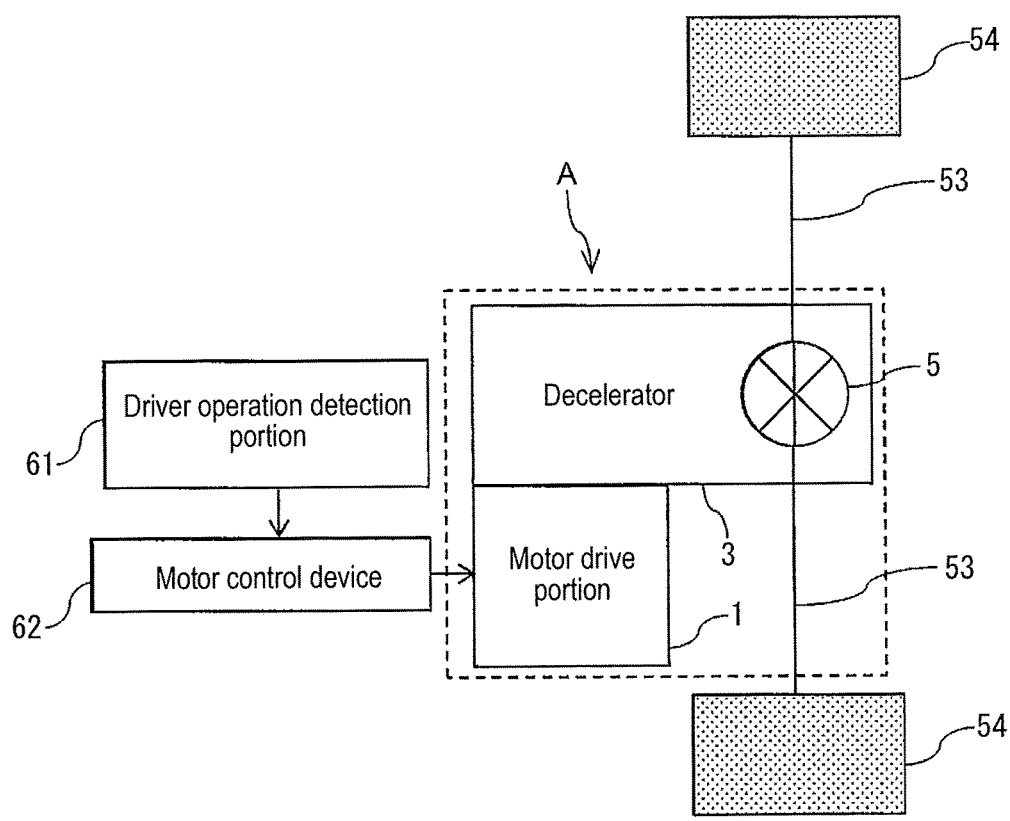

MOTOR DRIVE DEVICE

CROSS REFERENCE TO RELATED APPLICATIONS

This application is based on and claims priority under 35 U.S.C. § 119 to Japanese Patent Application 2016-60934, filed on Mar. 24, 2016, the entire content of which is incorporated herein by reference.

TECHNICAL FIELD

This disclosure generally relates to a motor drive device.

BACKGROUND DISCUSSION

A known drive device disclosed in JP2012-172796A (hereinafter referred to as Patent reference 1) includes a motor generator as a drive source, and a one-way clutch, a first gear train, a two-way clutch, and a second gear train as a decelerator.

The drive device disclosed in Patent reference 1 has the motor generator as the drive source, and outputs driving force from the decelerator to drive wheels. The decelerator includes the two-way clutch, the second gear train, the one-way clutch, and the first gear train that are juxtaposed in the aforementioned order on a motor output shaft extending within the decelerator from the motor generator. Alternatively, the decelerator includes the second gear train that contains the two-way clutch and the first gear train that contains the one-way clutch, and the second gear train and the first gear train are juxtaposed in the aforementioned order on the motor output shaft. For example, when the motor generator generates driving force by rotating in a first direction, the driving force rotating the drive wheels in the first direction is outputted by the one-way clutch via the first gear train. When the motor generator generates the driving force by rotating in a second direction that is opposite to the first direction, the driving force rotating the drive wheels in the first direction is outputted by the two-way clutch via the second gear train.

However, according to Patent reference 1, because the decelerator is configured such that the two-way clutch, the second gear train, the one-way clutch, and the first gear train are juxtaposed in the aforementioned order on the motor output shaft extending within the decelerator, or such that the second gear train containing the two-way clutch and the first gear train containing the one-way clutch are juxtaposed in the aforementioned order on the motor output shaft, the axial length of the decelerator in a direction of a rotary axis increases.

A need thus exists for a motor drive device which is not susceptible to the drawback mentioned above.

SUMMARY

According to an aspect of this disclosure, a motor drive device includes a stator being wounded with a coil and fixed at an inner portion of a case, a rotor being fixed on a hollow rotor shaft axially supported on the case so as to face an inner periphery of the stator, the rotor being rotatable by an energization to the coil, a first output shaft being provided in the rotor shaft and integrally rotating with a first drive gear, a second output shaft being provided in the first output shaft and integrally rotating with a second drive gear, a first one-way clutch being provided between an inner periphery of the rotor shaft and an outer periphery of the first output shaft, the first one-way clutch transmitting only a driving force that operates in a first direction, a second one-way clutch being provided between the inner periphery of the rotor shaft and an outer periphery of the second output shaft, the second one-way clutch transmitting only a driving force that operates in a second direction that is opposite to the first direction of the driving force operated by the first one-way clutch, and a decelerator being connected to the first drive gear and to the second drive gear and transmitting the driving forces to an axle.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a schematic view of a motor drive device when mounted on a vehicle according to an embodiment disclosed here.

DETAILED DESCRIPTION

Figure 2:
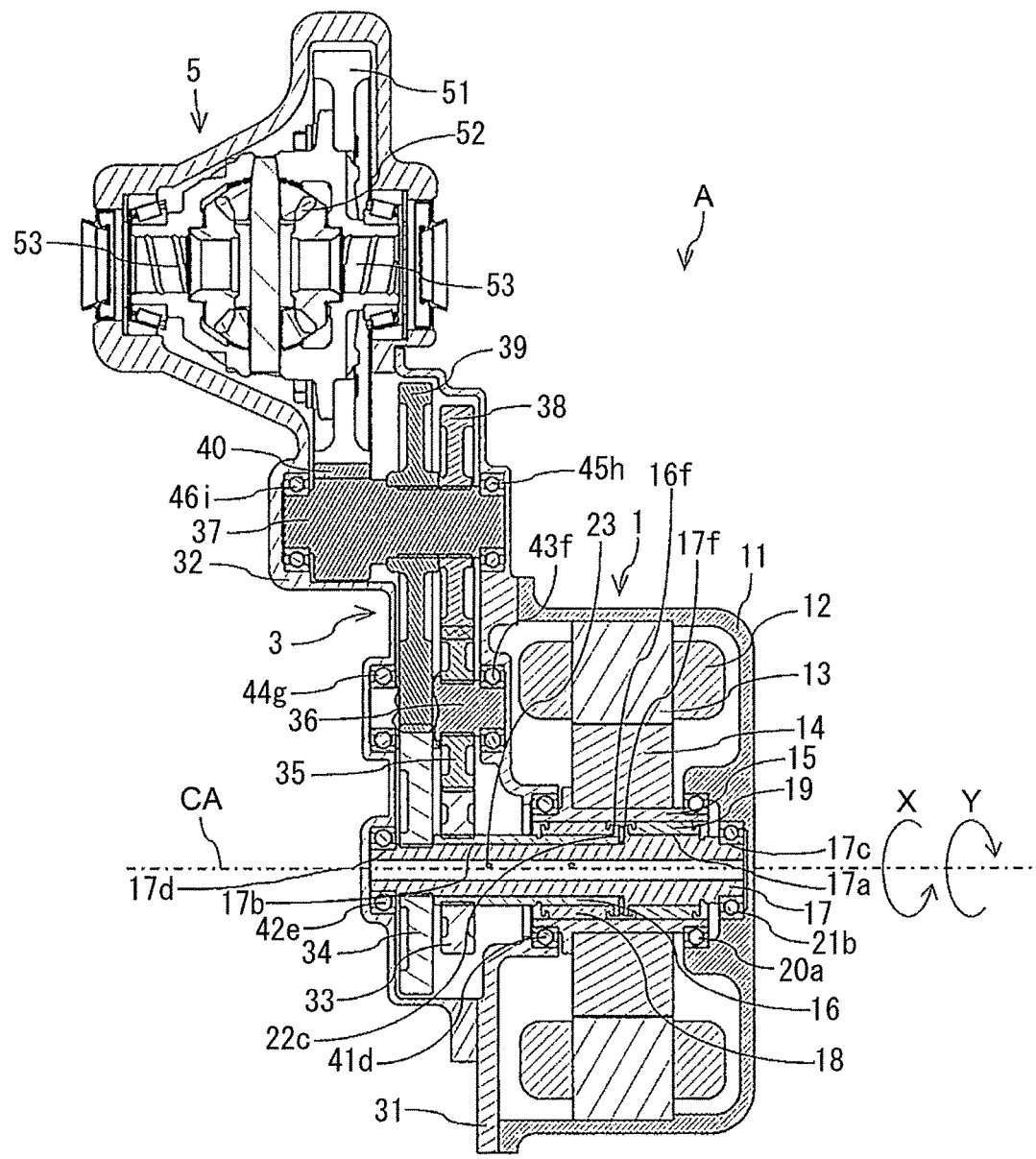
FIG. 2 a cross-sectional view of the motor drive device illustrated in FIG. 1.

FIG. 1 shows a structure of a motor drive device A having a motor as a drive source, the motor drive device A being mounted on a vehicle, as an embodiment. FIG. 1 shows a driver operation detection portion 61, a motor control device 62, the motor drive device A (including a motor drive portion 1, a decelerator 3, and a differential mechanism 5), a drive shaft 53 and drive wheels 54. For example, the driver operation detection portion 61 having a sensor and a switch detects driving operations such as an acceleration operation and a braking operation by a driver as operation signals. The signals detected by the driver operation detection portion 61 are inputted to the motor control device 62 that generates control signals controlling the motor drive portion 1. When the motor control device 62 outputs the control signals to the motor drive portion 1, the driving force generated by the motor drive portion 1 is transmitted to the drive wheels 54 by the decelerator 3 containing the differential mechanism 5 and via the drive shaft 53.

The detailed structure of this disclosure will be explained with reference to FIG. 2.

First, the structure of the motor drive portion 1 will be explained. A stator 13 being wound with a coil 12 is fixed on a motor case 11 (i.e, serving as a case). A rotor 14 rotatable with respect to a center axis CA of the stator 13 is press-fitted and fixed on an outer periphery of a rotor shaft 15. The rotor shaft 15 integrally rotating with the rotor 14 is axially supported so as to be rotatable in X- or Y-direction via a bearing 20a and a bearing 41d. The bearing 20a is fixed on an inner portion of a boss portion of the motor case (case) 11. The bearing 41d is fixed within a boss portion of a first case 31 covering a side surface of the decelerator 3. The first output shaft 16 is formed in a hollow cylindrical shape. A first end of the first output shaft 16 extends in a radial direction and is provided with a flange portion 16f (i.e., serving as a flat surface) having a flat surface orthogonal to the center axis CA. The first output shaft 16 is coaxially provided in the rotor shaft 15 and includes a second end that is not provided with the flange portion 16f, the second end that extends to an inner side of the decelerator 3. A first one-way clutch 18 that can transmit only a driving force that operates in a first direction is disposed between the first output shaft 16 and the rotor shaft 15.

A second output shaft 17 includes a large diameter portion 17a, a small diameter portion 17b that includes a diameter smaller than that of the large diameter 17a, and a flange portion 17f (i.e., serving as a flat surface) including a flat surface orthogonal to the center axis CA and extending in a radial direction. The large diameter portion 17a includes the same diameter as an outer diameter of the first output shaft 16. The small diameter portion 17b includes the diameter smaller than an inner diameter of the first output shaft 16, and includes a length in the axial direction longer than that of the first output shaft 16. The flange portion 17f and the flange portion 16f of the first output shaft 16 include the same diameter. A first end portion of the large diameter portion 17a, the first end portion that is not provided with the flange portion 17f, is provided with a first bearing portion 17c. A second end portion of the small diameter portion 17b, the second end portion that is not provided with the flange portion 17f, is provided with a second bearing portion 17d. The small diameter portion 17b of the second output shaft 17 is coaxially provided in the first output shaft 16. At the same time, the small diameter portion 17b axially supports the first output shaft 16 to be relatively rotatable therewith, and extends in the inner portion of the decelerator 3. A second one-way clutch 19 is disposed between the large diameter portion 17b of the second output shaft 17 and the rotor shaft 15. The second one-way clutch 19 may transmit only the driving force that is applied in a direction opposite to the driving force of the first one-way clutch 18. The second one-way clutch 19 and the first one-way clutch 18 include the same inner diameter, the same outer diameter, and the same length in the axial direction. The second output shaft 17 is coaxially supported by a bearing 21b that is fixed on the motor case 11 at the first bearing portion 17c, and is axially supported by a bearing 42e that is fixed on a second case 32 of the decelerator 3 at the second bearing portion 17d to be rotatable in X- or Y-direction.

Here, because the flange portion 16f of the first output shaft 16 and the flange portion 17f of the second output shaft 17 face with each other via a bearing 22c (i.e., serving as a sliding member), the first output shaft 16 and the second output shaft 17 relatively rotate with each other via the bearing 22c. Accordingly, the sliding resistance of a portion between the first output shaft 16 and the second output shaft 17 in the axial direction may be reduced by the bearing 22c. The flange portion 16f of the first output shaft 16 and the flange portion 17f of the second output shaft 17 may be provided at any positions as long as the flange portion 16f and the flange portion 17f may face with each other via a sliding member, for example, a bearing. One of the flange portion 16f and the flange portion 17f does not have to be provided as long as the flat surface of the first output shaft 16, the flat surface orthogonal to the center axis CA, and the flat surface of the second output shaft 17, the flat surface orthogonal to the center axis CA, face with each other via the sliding member, for example, the bearing. For example, the flange portion 16f and a flat surface of the large diameter portion 17a of the second output shaft 17, the flat surface orthogonal to the center axis CA, may face with each other via the sliding member, for example, the bearing. Alternatively, a flat surface of the first output shaft 16, the flat surface orthogonal to the center axis CA and the flange portion 17f may face with each other via the sliding member, for example, the bearing.

Moreover, a flow passage connected to the motor drive portion 1 is provided at the first case 31 of the decelerator 3, and sends lubricating oil to an inner portion of the motor drive portion 1 from the decelerator 3. The second output shaft 17 is formed in a hollow shape. An oil pump or a channelizing member is provided between an inner wall of the second case 32 of the decelerator 3 and a hollow opening portion of the second output shaft 17, or between an inner wall of the motor case 11 of the motor drive portion 1 and the hollow opening portion of the second output shaft 17. A lubricating oil supplied to the hollow opening portion of the second output shaft 17 by the oil pump or the channelizing member is supplied to a sliding portion of the first and second output shafts 16, 17 by an application of a decentralizing force of the rotation from an oil hole 23 penetratingly provided in the radial direction from the hollow opening portion of the small diameter portion 17b of the second shaft 17. Accordingly, the sliding resistance in the radial direction between the first and second output shafts 16, 17 may be reduced. Alternatively, the sliding resistance in the radial direction may be reduced by having a sliding member, for example, a bearing or a collar, between the first output shaft 16 and the small diameter portion 17b of the second output shaft 17.

As a supplementary note of the structure of the motor drive portion 1, the first and second one-way clutches 18, 19 are provided within the rotor shaft by the use of a dead space close to the rotor and the rotor shaft, the dead space conventionally provided within the motor drive portion 1, and the rotor shaft extends in the radial direction. Accordingly, the motor drive portion 1 is not upsized.

Each of the first and second one-way clutches 18, 19 may correspond to a one-way clutch having a known structure.

FIG. 2 discloses that the stator 13 is wounded with the coil 12 as an example of the embodiment of this disclosure. The disclosure may be available by having a structure in which a rotor is wounded with a coil, and a structure in which a stator and a rotor are wounded with a coil.

Next, the structure of the decelerator 3 will be explained. A first drive gear 33 is provided on the first output shaft 16 extending from the motor drive portion 1 to the inner portion of the decelerator 3 so as to be integrally rotatable with the first output shaft 16. Similarly, a second drive gear 34 is disposed on the small diameter portion 17b of the second output shaft 17 extending from the motor drive portion 1 to the inner portion of the decelerator 3, the second drive gear 34 disposed opposite to the first drive gear 33 in the axial direction, so as to be integrally rotatable with the small diameter portion 17b. An idler gear 35 integrally rotates with an idler shaft 36 axially and parallelly supported with the center axis CA by a bearing 43f fixed to a first case 31 and a bearing 44g fixed to the second case 32. A first driven gear 38 integrally rotates with the counter shaft 37 The first drive gear 33 meshes with a first driven gear 38 integrally rotating with a counter shaft 37 axially and parallelly supported with the center axis CA by a bearing 45h fixed to the first case 31 and a bearing 46i fixed to the second case 32. The first drive gear 33 meshes with the first driven gear 38 via the idler gear 35. Meanwhile, the second drive gear 34 meshes with a second driven gear 39 integrally rotating with the counter shaft 37. A final gear 40 being provided on the counter shaft 37 meshes with a ring gear 51 so that a differential gear 52 being juxtaposed with the ring gear 51 is connected to a drive shaft 53 that is connected to right-left wheels. A first gear ratio being established by the first drive gear 33, the idler gear 35, and the first driven gear 38 and a second gear ratio being established by the second drive gear 34 and the second driven gear 39 are different from each other.

Next, when the rotor 14 of the motor drive portion 1 generates driving force in X direction shown in FIG. 2 will be explained. When the coil 12 is energized to have the rotor 14 and the rotor shaft 15 of the motor drive portion 1 generate driving force in X direction, the first output shaft 16 rotates in X direction to transmit the driving force by the first one-way clutch 18. Here, because the second one-way clutch 19 connecting the rotor shaft 15 and the second output shaft 17 may transmit only the driving force that operates in Y direction that is opposite to X direction, the driving force in X direction is not transmitted to the second output shaft 17. The driving force rotating the first output shaft 16 in X direction is transmitted to the first drive gear 33, the idler gear 35, the first driven gear 38, the counter shaft 37, the final gear 40, the ring gear 51, the differential gear 52, and the drive shaft 53 in the aforementioned order. The drive shaft 53 outputs the driving force in the normal direction to rotate the right-left wheels. The driving force is transmitted from the second driven gear 39 that is on the counter shaft 37 to the second output shaft 17 via the second drive gear 34. The second output shaft 17 rotates in Y direction. Because the rotor 14 and the rotor shaft 15 rotate in X direction, the second one-way clutch 19 does not transmit the driving force and the second output shaft 17 only idles.

Next, when the rotor 14 of the motor drive portion 1 generates driving force in Y direction shown in FIG. 2 will be explained. When the coil 12 is energized to have the rotor 14 and the rotor shaft 15 of the motor drive portion 1 generate driving force in Y direction, the second output shaft 17 rotates in Y direction to transmit the driving force by the second one-way clutch 19. Here, because the first one-way clutch 18 connecting the rotor shaft 15 and the first output shaft 16 may transmit only the driving force that operates in X direction, the driving force in Y direction is not transmitted to the first output shaft 16. The driving force rotating the second output shaft 17 in Y direction is transmitted to the second drive gear 34, the second driven gear 39, the counter shaft 37, the final gear 40, the ring gear 51, the differential gear 52, and the drive shaft 53 in the aforementioned order. The drive shaft 53 outputs the driving force in the normal direction to rotate the right-left wheels. The driving force is transmitted from the first driven gear 38 that is on the counter shaft 37 to the first output shaft 16 via the idler gear 35 and the first drive gear 33. The first output shaft 16 rotates in X direction. Because the rotor 14 and the rotor shaft 15 rotate in Y direction, the first one-way clutch 18 does not transmit the driving force and the first output shaft 18 only idles.

The motor drive device A of the disclosure outputs the driving force generated by the energization to the coil 12 of the motor drive portion 1 to the drive shaft 53 by selecting the first gear ratio or the second gear ratio in response to an energizing direction to the coil 12. The first gear ratio is established by the first drive gear 33, the idler gear 35 and the first driven gear 38 of the decelerator 3. The second gear ratio is established by the second drive gear 34 and the second driven gear 39.

Furthermore, being made from a non-magnetic material, the rotor shaft 15 of the motor drive portion 1 is prevented from being heated by the magnetic induction induced by the first and second one-way clutches 18, 19 and the first and second output shafts 16, 17.

The disclosure is not limited to the aforementioned embodiment, and may be applied to various embodiments. For example, the motor drive device of the disclosure is not limited to be mounted on a vehicle, and may be mounted on various devices and machines that may use a motor as a drive source.

According to the aforementioned embodiment, the motor drive device (A) includes the stator (13) being wounded with the coil (12) and fixed at the inner portion of the case (the motor case 11), the rotor (14) being fixed on the hollow rotor shaft (15) axially supported on the case (the motor case 11) so as to face the inner periphery of the stator (13), the rotor (14) being rotatable by an energization to the coil (12), the first output shaft (16) being provided in the rotor shaft (15) and integrally rotating with the first drive gear (33), the second output shaft (17) being provided in the first output shaft (16) and integrally rotating with the second drive gear (34), the first one-way clutch (18) being provided between the inner periphery of the rotor shaft (15) and the outer periphery of the first output shaft (16), the first one-way clutch (18) transmitting only the driving force that operates in the first direction, the second one-way clutch (19) being provided between the inner periphery of the rotor shaft (15) and the outer periphery of the second output shaft (17), the second one-way clutch (19) transmitting only the driving force that operates in the second direction that is opposite to the first direction of the driving force operated by the first one-way clutch (18); and the decelerator (3) being connected to the first drive gear (33) and to the second drive gear (34) and transmitting the driving forces to the axle.

According to the aforementioned construction, because the first one-way clutch (18) transmitting only the driving force that operates in the first direction and the second one-way clutch (19) transmitting only the driving force that operates in the second direction that is opposite to the first direction are disposed within the rotor shaft (15), the first one-way clutch (18) transmitting only the driving force that operates in the first direction and the second one-way clutch (19) transmitting only the driving force that operates in the second direction that is opposite to the first direction do not have to be disposed within the decelerator (3). Accordingly, the length of the decelerator (3) in the direction of the rotary axis may be reduced comparing to that of a known decelerator.

According to the aforementioned embodiment, the first one-way clutch (18) and the second one-way clutch (19) include the same inner diameter, the same outer diameter, and the same length in axial directions of the first one-way clutch (18) and of the second one-way clutch (19).

Accordingly, when the first and second one-way clutches (18, 19) that include the same construction are disposed in the opposite orientation, the transmission directions of the driving force come to be opposite to each other and the first and second one-way clutches (18, 19) may be commonly used. Accordingly, the manufacturing cost may be reduced.

According to the aforementioned embodiment, the rotor shaft (15) is made from the non-magnetic material.

Accordingly, the rotor shaft 15 of the motor drive portion 1 is prevented from being heated by the magnetic induction induced by the first and second one-way clutches 18, 19 and the first and second output shafts 16, 17.

According to the aforementioned embodiment, the first output shaft (16) is axially supported by the second output shaft (17).

Accordingly, because the first output shaft (16) is axially supported by the second output shaft (17), the first output shaft (16) does not have to include an axial support portion.

According to the aforementioned embodiment, the second output shaft (17) includes the large diameter portion (17a) having the flat surface (the flange portion 17f) orthogonal to the center axis (CA) of the second output shaft (17), the first output shaft (16) includes the flat surface (the flange portion 16f) orthogonal to the center axis (CA). The flat surface (the flange portion 17f) of the large diameter portion (17a) of the second output shaft (17) faces the flat surface (the flange portion 16f) of the first output shaft (16) via the sliding member (the bearing 22c).

Accordingly, because the first and second output shafts (16, 17) relatively rotate with each other via the sliding member (the bearing 22c), the sliding resistance generated between the first and second output shafts (16, 17) in the axial direction may be reduced.

According to the aforementioned embodiment, each of the flat surface (the flange portion 16f) of the first output shaft (16) and the flat surface (the flange portion 17f) of the large diameter portion (17a) of the second output shaft (17) is formed in a flange shape.

Accordingly, when the sliding area of the sliding member (the bearing 22c) that is disposed between the flat surface (the flange portion 16f) of the first output shaft (16), the flat surface (the flange portion 16f) orthogonal to the center axis (CA), and the flat surface (the flange portion 17f) of the second output shaft (17), the flat surface (the flange portion 17f) orthogonal to the center axis (CA), are formed in a flange shape, the sliding area of the sliding member (the bearing 22c) that is disposed between the flat surface (the flange portion 16f) of the first output shaft (16), the flat surface (the flange portion 16f) orthogonal to the center axis (CA), and the flat surface (the flange portion 17f) of the second output shaft (17), the flat surface (the flange portion 17f) orthogonal to the center axis (CA), increases. Accordingly, the sliding member (the bearing 22c) may favorably slide. At the same time, because the surface pressure applied to the sliding surface may be reduced, the sliding resistance generated between the first and second output shafts (16, 17) in the axial direction may further be reduced.

According to the aforementioned embodiment, the second output shaft (17) is formed in a hollow shape and includes the oil hole (23).

Accordingly, the sliding resistance in the radial direction between the first and second output shafts 16, 17 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor drive device, comprising:
   a stator being wounded with a coil and fixed at an inner portion of a case;
   a rotor being fixed on a hollow rotor shaft axially supported on the case so as to face an inner periphery of the stator, the rotor being rotatable by an energization to the coil;
   a first output shaft being provided in the rotor shaft and integrally rotating with a first drive gear;
   a second output shaft being provided in the first output shaft and integrally rotating with a second drive gear;
   a first one-way clutch being provided between an inner periphery of the rotor shaft and an outer periphery of the first output shaft, the first one-way clutch transmitting only a driving force that operates in a first direction;
   a second one-way clutch being provided between the inner periphery of the rotor shaft and an outer periphery of the second output shaft, the second one-way clutch transmitting only a driving force that operates in a second direction that is opposite to the first direction of the driving force operated by the first one-way clutch; and
   a decelerator being connected to the first drive gear and to the second drive gear and transmitting the driving forces to an axle.

2. The motor drive device according to claim 1, wherein the first one-way clutch and the second one-way clutch include a same inner diameter, a same outer diameter, and a same length in axial directions of the first one-way clutch and of the second one-way clutch.

3. The motor drive device according to claim 2, wherein the rotor shaft is made from a non-magnetic material.

4. The motor drive device according to claim 3, wherein the first output shaft is axially supported by the second output shaft.

5. The motor drive device according to claim 4, wherein
   the second output shaft includes a large diameter portion having a flat surface orthogonal to a center axis of the second output shaft;
   the first output shaft includes a flat surface orthogonal to the center axis; and
   the flat surface of the large diameter portion of the second output shaft faces the flat surface of the first output shaft via a sliding member.

6. The motor drive device according to claim 5, wherein each of the flat surface of the first output shaft and the flat surface of the large diameter portion of the second output shaft is formed in a flange shape.

7. The motor drive device according to claim 6, wherein the second output shaft is formed in a hollow shape and includes an oil hole.

8. The motor drive device according to claim 5, wherein the second output shaft is formed in a hollow shape and includes an oil hole.

9. The motor drive device according to claim 4, wherein the second output shaft is formed in a hollow shape and includes an oil hole.

10. The motor drive device according to claim 2, wherein the first output shaft is axially supported by the second output shaft.

11. The motor drive device according to claim 10, wherein
    the second output shaft includes a large diameter portion having a flat surface orthogonal to a center axis of the second output shaft;
    the first output shaft includes a flat surface orthogonal to the center axis; and
    the flat surface of the large diameter portion of the second output shaft faces the flat surface of the first output shaft via a sliding member.

12. The motor drive device according to claim 11, wherein each of the flat surface of the first output shaft and the flat surface of the large diameter portion of the second output shaft is formed in a flange shape.

13. The motor drive device according to claim 1, wherein the rotor shaft is made from a non-magnetic material.

14. The motor drive device according to claim 13, wherein the first output shaft is axially supported by the second output shaft.

15. The motor drive device according to claim 14, wherein
the second output shaft includes a large diameter portion having a flat surface orthogonal to a center axis of the second output shaft;
the first output shaft includes a flat surface orthogonal to the center axis; and
the flat surface of the large diameter portion of the second output shaft faces the flat surface of the first output shaft via a sliding member.

16. The motor drive device according to claim 15, wherein each of the flat surface of the first output shaft and the flat surface of the large diameter portion of the second output shaft is formed in a flange shape.

17. The motor drive device according to claim 1, wherein the first output shaft is axially supported by the second output shaft.

18. The motor drive device according to claim 17, wherein
the second output shaft includes a large diameter portion having a flat surface orthogonal to a center axis of the second output shaft;
the first output shaft includes a flat surface orthogonal to the center axis; and
the flat surface of the large diameter portion of the second output shaft faces the flat surface of the first output shaft via a sliding member.

19. The motor drive device according to claim 18, wherein each of the flat surface of the first output shaft and the flat surface of the large diameter portion of the second output shaft is formed in a flange shape.

20. The motor drive device according to claim 1, wherein the second output shaft is formed in a hollow shape and includes an oil hole.

* * * * *